May 15, 1923.
J. F. STREIB
BRAKE
Filed Feb. 8, 1921
1,455,311
3 Sheets-Sheet 1
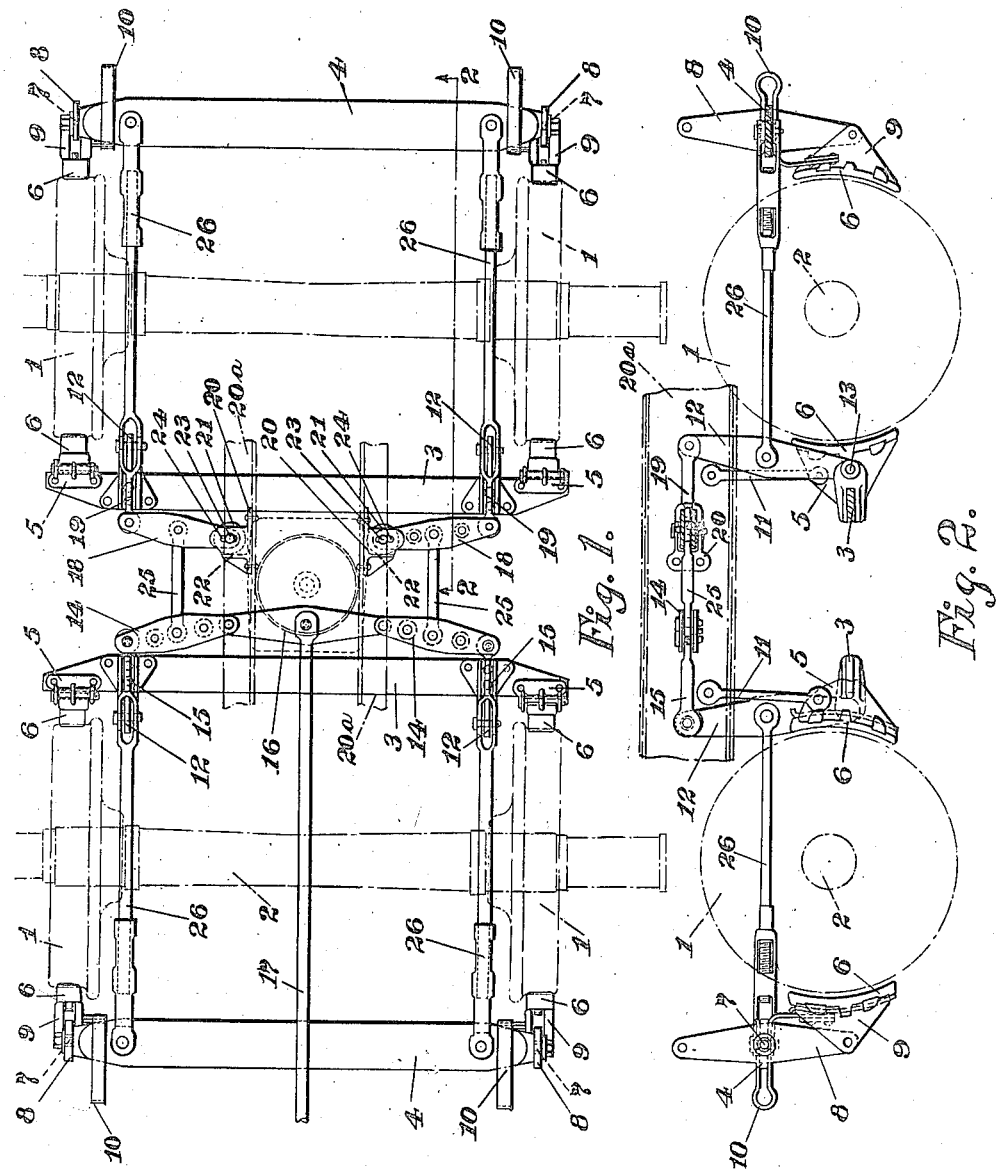
Witnesses
Edythe Lambe
Alice Smith
Inventor
John F. Streib,
By
G. L. Lambe.
Attorney Patented May 15, 1923.

1,455,311

UNITED STATES PATENT OFFICE.

JOHN F. STREIB, OF AVALON, PENNSYLVANIA, ASSIGNOR TO PRESSED STEEL CAR COMPANY, OF PITTSBURGH, PENNSYLVANIA, A CORPORATION OF NEW JERSEY.

BRAKE.

Application filed February 8, 1921. Serial No. 443,373.

*To all whom it may concern:*

Be it known that I, JOHN F. STREIB, a citizen of the United States, residing in Avalon, in the county of Allegheny and State of Pennsylvania, have invented certain new and useful Improvements in Brakes, of which the following is a specification.

This invention relates to brakes for railway cars and more particularly to the type known as clasp brakes which are attached to the body of the car and to the truck, and has for an object the provision of means for connecting a portion of the brake to the car body in such a manner that relative movement between the brake and the car body is permitted so that the brake will not be affected by the angularity of the truck relative to the car body when the car to which the brake is applied is rounding a curve in the track, and will, at the same time, obviate any binding or bending action between the levers and rods of the brake due to such angularity of the truck.

A further object of the invention is to provide a clasp brake having a fulcrum bracket rigidly secured to the car body and a compensating connection between two of the dead levers of said brake and the fulcrum brackets to enable the same operative proportionate leverage to be maintained when the car to which the brake is applied is rounding a curve.

Figure 3:
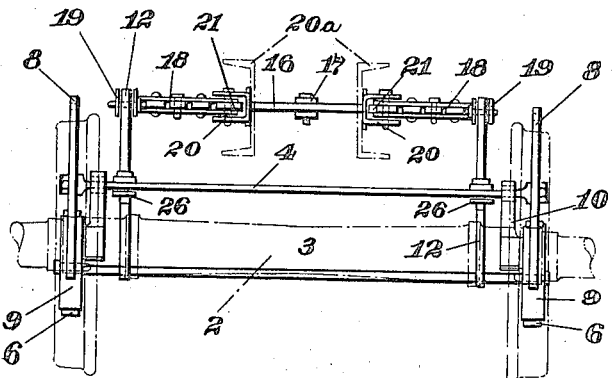
Figure 5:
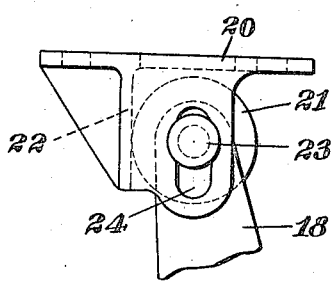
Figure 6:
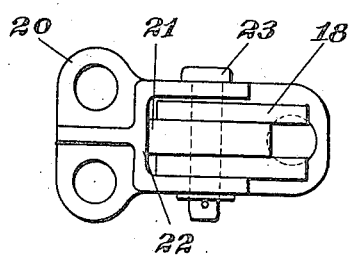
Figure 7:
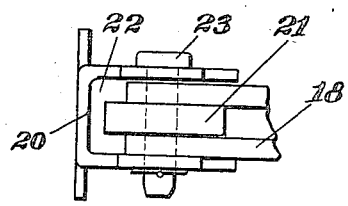
Figure 4:
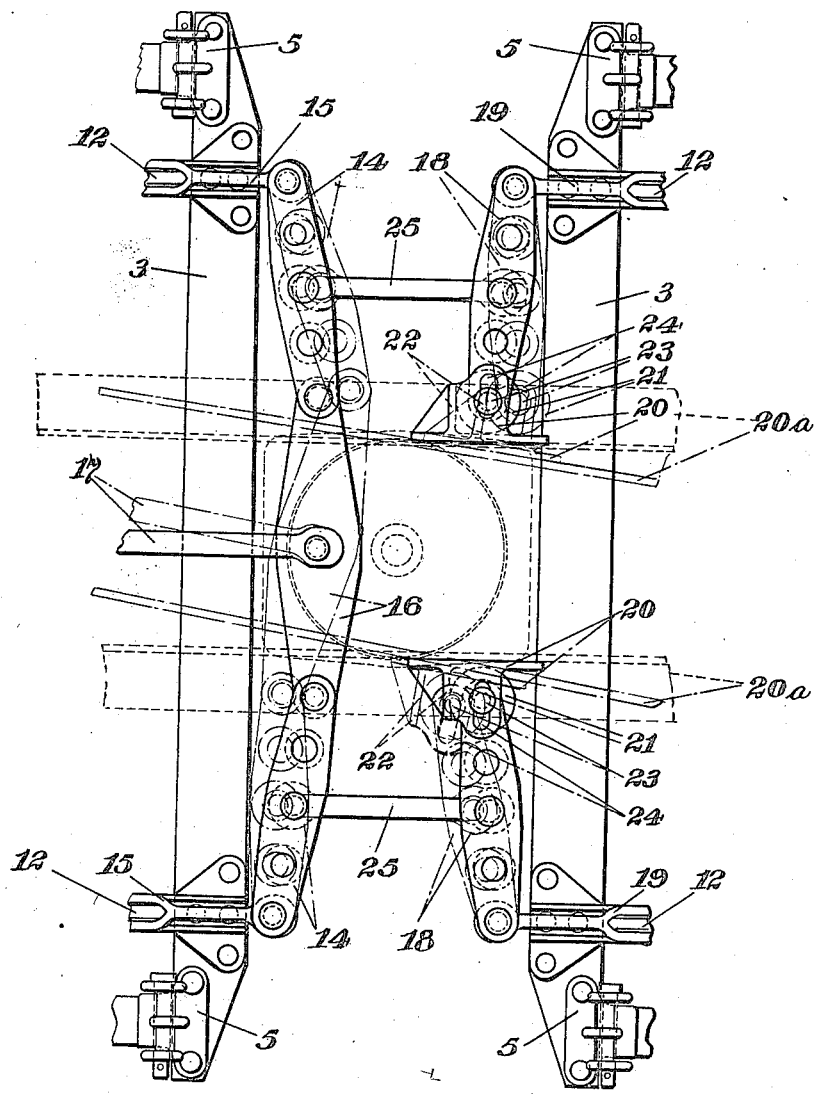

Referring now to the drawings in which like reference characters refer to like parts, Fig. 1, is a plan view of the brake the wheels and axles of the truck and the center sills of the car body being shown in dot and dash lines. Fig. 2, is a composite view, the left hand half being a side elevational view and the right hand half is a sectional view taken on the line 2—2 of Fig. 1. Fig. 3, is an end elevational view of the same. Fig. 4, is an enlarged detail view of a portion of the brake attached to the car body, the full lines indicating the brake in its normal position when the truck is travelling on straight track and the dot and dash lines showing the brake in its normal position when the truck is rounding a curve. Fig. 5, is a detail plan view of the fulcrum bracket and the horizontal brake lever mounted therein. Fig. 6, is a side elevational view of the same and Fig. 7, is an end elevational view of the same.

Referring now in detail to the drawings in which like reference characters refer to like parts the reference character 1, indicates the wheels of a car truck which are mounted on axles 2 in the usual manner, such axles being journaled in the truck frame (not shown) in any suitable manner.

Each pair of wheels is provided with brake beams 3 and 4, the beam 3 being arranged at one side of one of the pairs of wheels and the beam 4 at the opposite side of such pairs. The beams 3 may be of any suitable form but as illustrated in the drawings preferably comprise flat plates which are horizontally disposed, each of which beams is preferably of such a length as to extend from wheel to wheel transversely of the truck. At each end of the beam a brake shoe head 5 is secured, each of which heads has secured thereto a brake shoe 6 which is adapted to engage one of the wheels. The beams 4 may also be of any suitable form but as illustrated in the drawings each beam preferably comprises a flat plate which is horizontally disposed and is preferably of such a length as to extend from wheel to wheel transversely of the truck. The end portions of these beams 4 are provided with trunnions 7, on which the vertically disposed dead levers 8 are loosely mounted. Above the beam 4 each of the dead levers 8 is anchored to a part of the truck frame, (not shown) and below the beam each of these levers is provided with a brake shoe head 9 which in turn is provided with a brake shoe which is adapted to engage one of the wheels. This brake shoe head is pivotally connected with the lever and is held in its proper position relative to the wheel by means of a spring member 10 which is mounted on the beam and is secured to the brake shoe head.

To support the beams 3, hangers 11 are provided, one end of each of which is pivotally secured to the truck frame (not shown) and the other end to the brake shoe head or to any other suitable part of the brake beam, while the dead levers 8 support the brake beams 4. Between the wheels of each pair of wheels vertically disposed live levers 12 are provided each of which at its lower end is pivotally connected with one of the brake beams 3 as indicated at 13. The upper end of each of these levers 12 at one end of the truck are connected with one end of a horizontally disposed floating lever 14 through the medium of a rod 15, the opposite end of the floating lever being connected with one end of an equalizer lever 16 which in turn is connected with the pull rod 17. The upper end portion of each of these levers 12 at the opposite end of the truck are connected with one end of a horizontally disposed dead lever 18 through the medium of a rod 19, the opposite end of such lever being secured to a fulcrum bracket 20 which bracket is preferably secured to the center sills 20ª of the car body. The end portion of the dead lever 18 is provided with a roller 21 which is adapted to engage a vertical disposed outwardly projecting portion 22 of the fulcrum bracket. This roller is held in place on the lever by a pin 23 the upper and lower ends of which are loosely mounted in slots 24 so that movement of the brake relative to the car body will be permitted without causing the several parts of the brake to bind on each other or to become accidentally bent or broken due to such movement. At each side of the longitudinal center line of the truck and of the brake the floating lever 14 is connected with the horizontally disposed dead lever 18 through the medium of a rod 25 which is connected with the levers intermediate their ends.

The brake beams 4 are arranged in a plane above the brake beams 3 such beams 4 being connected with the levers 8 by rods 26 such rods at one end being connected with the levers 12 at a point intermediate their ends. By placing the beams 4 in a plane above the beams 3, the placing of the rod 26 some distance above the axles 2 is facilitated, thus reducing the parts of the brake to a minimum, as well as guarding such rods against damage by the axles, or objects which may project from the road bed. It will be noted that should the rods 26 be placed below the car axles, a number of extra levers and connections would have to be introduced, to render the brake as a whole operative.

It will be noted that as the truck rounds a curve the rollers 21 will engage and roll on the portion 22 of the fulcrum bracket and that the pin 23 will move freely in the slots 24 in the fulcrum bracket.

It will be apparent to those skilled in the art to which this invention appertains that changes may be made in the construction and arrangement of the several parts forming the brake rigging without departing from the spirit and scope of the appended claims.

Having thus described the invention what claim as new and desire to secure by Letters Patent is:—

1. The combination with a car body and a truck, of a brake mounted on said truck and having a horizontally disposed dead lever slidably connected with said body to permit said truck to move at an angle to said body without moving said lever relative to said truck.

2. The combination with a car body and a truck, of a brake rigging mounted on said truck and connected with said body, said rigging comprising a dead lever and a sliding connection between said body and lever whereby said truck may be moved to a position at an angle to said body without moving said brake transversely of the truck.

3. In a brake rigging for railway cars, the combination with a car body and a truck, of brake shoes applied to both sides of each wheel, and levers and rods for actuating said shoes, one of said levers at each side of the truck being adjustably connected with said body, whereby said truck may be moved to a position at an angle to said body without moving said levers and rods transversely of the truck.

4. In a brake rigging for railway cars, the combination with a car body and a truck, said truck having a plurality of pairs of wheels, of brake beams at both sides of each pair of wheels, the brake beam at one side of one pair of wheels being on a higher horizontal plane than the beam at the opposite side of said pair of wheels, a lever pivotally mounted on the first mentioned beam, a brake head and shoe pivotally mounted on said lever below said beam, said lever above said beam being connected with said truck.

5. In a brake rigging, the combination with a car body and a truck, a brake beam at both sides of each pair of wheels, fulcrum brackets secured to said body, and levers and rods for actuating said beams, one of said levers at each side of the truck being loosely mounted in said bracket.

6. The combination with a car body, of a brake mechanism comprising a horizontally disposed dead lever having an automatic adjusting connection with said car body.

7. The combination with the body and truck of a car, of a brake rigging mounted on said truck, said brake rigging comprising a dead lever at each side of the truck, each of said levers being movably fulcrumed to said body whereby said lever is adapted to move in the direction of its length relative to said body.

8. The combination with the body and truck of a car, of a brake rigging mounted on said truck, said brake rigging comprising a plurality of horizontally disposed floating levers and a plurality of horizontally disposed dead levers connected with said body adapted to be moved in the direction of their lengths relative to said body, and a rod connecting each floating lever with the adjacent dead lever.

9. The combination with a car body and a truck, of brake rigging carried by said truck, said brake rigging comprising a dead lever having a rolling connection with said body.

10. The combination with a car body and a truck, of a brake rigging carried by said truck, said brake rigging comprising a dead lever, a bracket secured to said car body, and a roller mounted on said lever adapted to engage said bracket.

11. The combination with a car body and a truck, of a brake rigging carried by said truck, said brake rigging comprising a horizontally disposed dead lever having a connection with said body which will permit said lever to move in the direction of its length relative to said body when said truck is moved at an angle to said body.

12. The combination with a car body and a truck, of a brake rigging carried by said truck, said brake rigging comprising a plurality of vertically disposed dead levers secured to said truck, a plurality of vertically disposed live levers, rods connecting said dead and live levers, floating levers connected with two of said live levers, horizontally disposed dead levers connected with two of said live levers and loosely fulcrumed on said body, and rods connecting said horizontally disposed levers.

13. The combination with a car body and a truck, of a brake rigging carried by said truck, said brake rigging comprising a dead lever, a bracket secured to said body and having a slot formed therein, and a pin connecting said lever and bracket, said pin being slidably mounted in said slot.

14. In a brake rigging for a railway car, the combination with the body and truck of the car, of a bracket secured to said body and a brake lever mounted on said truck adapted to engage said bracket and permit said lever to move relative to said body when said truck is moved at an angle to said body.

15. The combination with a car body, of a brake mechanism comprising a dead lever movable in the direction of its length having an automatic adjusting connection with said car body.

16. The combination with the body and truck of a car, of a brake rigging mounted on said truck, said brake rigging comprising a dead lever and means whereby said lever is permitted to move in the direction of its length relative to said body.

17. The combination with a car body and a truck, of brake rigging carried by said truck, said brake rigging comprising a dead lever adapted to engage said body and movable in the direction of its length relative to said body.

18. The combination with a car body and truck, of a brake rigging carried by said truck, a bracket secured to said body, a dead lever adapted to engage said bracket and means whereby said lever is permitted to move in the direction of its length when said truck is moved at an angle to said body.

19. The combination with a car body and truck, of a brake rigging carried by said truck, said brake rigging comprising a dead lever, a fulcrum on said body with which said lever is directly connected, and means whereby said lever is permitted to be moved relative to said body when said truck is moved at an angle to said body.

20. The combination with a car body and a truck, of a brake fulcrum on said body, of a brake lever carried by said truck and adapted to directly engage said fulcrum, and means whereby said lever is permitted to move in the direction of its length relative to said body.

In testimony whereof I affix my signature in the presence of two witnesses.

JOHN F. STREIB.

Witnesses:
JOHN J. CLARKE,
EDYTHE LAMBE.